US008547374B1

(12) United States Patent
Sadjadi et al.

(10) Patent No.: US 8,547,374 B1
(45) Date of Patent: Oct. 1, 2013

(54) DETECTION AND RECONSTRUCTION OF 3D OBJECTS WITH PASSIVE IMAGING SENSORS

(75) Inventors: Firooz A. Sadjadi, St. Anthony, MN (US); Evan J. Ribnick, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 993 days.

(21) Appl. No.: 12/576,687

(22) Filed: Oct. 9, 2009

Related U.S. Application Data

(60) Provisional application No. 61/228,357, filed on Jul. 24, 2009.

(51) Int. Cl.
*G06T 15/00* (2011.01)

(52) U.S. Cl.
USPC ........... 345/419; 345/420; 345/421; 345/427; 348/294; 382/103; 382/154

(58) Field of Classification Search
USPC ................. 345/423, 424, 426, 427, 419–421; 348/294; 382/103, 154
See application file for complete search history.

(56) References Cited

U.S. PATENT DOCUMENTS

| 5,475,422 | A | 12/1995 | Mori et al. |
| 6,246,742 | B1 * | 6/2001 | Besson et al. ...................... 378/8 |
| 6,621,448 | B1 | 9/2003 | Lasky et al. |
| 6,680,735 | B1 * | 1/2004 | Seiler et al. .................... 345/424 |
| 7,106,348 | B2 | 9/2006 | Matsumoto et al. |
| 7,161,606 | B2 | 1/2007 | González-Baños et al. |
| 7,224,357 | B2 * | 5/2007 | Chen et al. ..................... 345/420 |
| 7,856,125 | B2 * | 12/2010 | Medioni et al. ............... 382/118 |
| 7,940,279 | B2 * | 5/2011 | Pack .............................. 345/582 |
| 8,126,261 | B2 * | 2/2012 | Medioni et al. ............... 382/154 |
| 8,213,707 | B2 * | 7/2012 | Li et al. ......................... 382/154 |
| 2009/0116732 | A1 | 5/2009 | Zhou et al. |
| 2009/0160985 | A1 * | 6/2009 | Javidi et al. ................... 348/294 |
| 2010/0034426 | A1 * | 2/2010 | Takiguchi et al. ............ 382/106 |

OTHER PUBLICATIONS

McManamon et al. "New Paradigms for Active and Passive 3D Remote Object Sensing, Visualization, and Recognition", 2008 SPIE Digital Library.*
Barinova et al., "Fast automatic single-view 3-d reconstruction of urban scenes", Proc. European Conf. Comp. Vis., 2008, 14 pages total.
Binder et al., "SAR foliage penetration phenomenology of tropical rain forest and northern U.S. forest", Record of the IEEE Int'l Radar Conf., 1995, 6 pages total.

(Continued)

*Primary Examiner* — Kimbinh T Nguyen
(74) *Attorney, Agent, or Firm* — Hamre, Schumann, Mueller & Larson, P.C.

(57) ABSTRACT

A 3D reconstruction technique using integral imaging, which does not require computing point correspondences. The technique has been demonstrated that it can effectively estimate the surface of an object, and reconstruct the surfaces of partially occluded objects. Reconstruction can be performed from either an array of imaging sensors, or a single moving imaging sensor with known positions. The technique relies on the concept that each view is allowed to vote on the contents of the scene via ray tracing. Various sharpness metrics are utilized for estimating the locations of visible surfaces in the views, and reconstruction is posed as an optimization problem.

14 Claims, 13 Drawing Sheets

(56) References Cited

OTHER PUBLICATIONS

Burckhardt, "Optimum parameters and resolution limitation of integral photography", Journal of the Optical Society of America, vol. 58, No. 1, Jan. 1968, pp. 71-76.

Cornelis et al., "3D Urban scene modeling integrating recognition and reconstruction", Int J Comput Vis, vol. 78, 2008, pp. 121-141.

Hernández et al., "Multi-view photometric stereo", IEEE Trans. Pattern Analysis and Machine Intelligence, vol. 30, No. 3, 2008, pp. 548-554.

Hong et al., "Three-dimensional volumetric object reconstruction using computational integral imaging", Optics Express, vol. 12, No. 3, Feb. 9, 2004, pp. 483-491.

Hong et al., "Improved resolution 3D object reconstruction using computational integral imaging with time multiplexing", Optics Express, vol. 12, No. 19, Sep. 20, 2004, pp. 4579-4588.

Hwang et al., "Extraction of location coordinates of 3-D objects from computationally reconstructed integral images basing on a blur metric", Optics Express, vol. 16, No. 6, Mar. 17, 2008, pp. 3623-3635.

Hwang et al., "Depth extraction of three-dimensional objects in space by the computational integral imaging reconstruction technique", Applied Optics, vol. 47, No. 19, Jul. 1, 2008, pp. 128-135.

Levoy et al., "Light field rendering", Proc. Int'l Conf. Comp. Graphics and Interactive Techniques, 1996, 12 pages total.

Marks et al., "Three-dimensional source reconstruction with a scanned pinhole camera", Optics Letters, vol. 23, No. 11, Jun. 1, 1998, pp. 820-822.

Panah et al., "Three dimensional imaging with randomly distributed sensors", Optics Express, vol. 16, No. 9, Apr. 28, 2008, pp. 6368-6377.

Pollefeys, "Self-calibration and metric 3D reconstruction from uncalibrated image sequences," PhD thesis, Katholieke Universiteit Leuven, 1999, 240 pages total.

Pollefeys et al., "Detailed real-time urban 3d reconstruction from video", Int J Comput Vis, vol. 78, 2008, pp. 143-167.

Sadjadi, "Comparative image fusion analysis", Proc. IEEE Conf. Computer Vision and Pattern Recognition, 2005, 8 pages total.

Schlag et al., "Implementation of automatic focusing algorithms for a computer vision system with camera control", Carnegie-Mellon University, Aug. 15, 1983, 91 pages total.

Seitz et al., "A comparison and evaluation of multi-view stereo reconstruction algorithms", Proc. IEEE Conf. Computer Vision and Pattern Recognition, 2006, 8 pages total.

Seitz et al., "Photorealistic scene reconstruction by voxel coloring", Int J Comput Vis, vol. 35, 1999, pp. 151-173.

Tavakoli et al., "Performance of 3D integral imaging with position uncertainty", Optics Express, vol. 15, No. 19, Sep. 17, 2007, pp. 11889-11902.

Vaish et al., "Reconstructing occluded surfaces using synthetic apertures: stereo, focus, and robust measures", Proc. IEEE Conf. Computer Vision and Pattern Recognition, 2006, 8 pages total.

Tenenbaum, "Accommodation in computer vision", PhD thesis, Stanford University, 1971, 472 pages total.

\* cited by examiner

50

DETECTION AND RECONSTRUCTION OF 3D OBJECTS WITH PASSIVE IMAGING SENSORS

FIELD

This disclosure relates to a system and method for reconstructing three-dimensional (3D) objects from two-dimensional (2D) images.

BACKGROUND

It is known to use active technologies to perform 3D reconstruction, such as using laser radar. However, since the sensor is not passive, it can be detected and is not covert. Other techniques exist for reconstructing a 3D model of an object from multiple camera views. However, most of these techniques rely on image feature detection and matching, which is a very hard problem.

Furthermore, very few of the existing 3D reconstruction techniques using cameras have addressed the issue of reconstructing objects which are occluded in the input images. Those techniques that have addressed this issue have focused mainly on visualizing an object behind an occlusion, but not obtaining a detailed 3D model of it.

SUMMARY

A system and method are described where multiple views of a scene, taken by at least one passive imaging sensor, are utilized to detect and reconstruct object surfaces in three dimensions. The described system and method can be used for the reconstruction of partially occluded objects where the views of the objects are obstructed so that they are only partially visible. The input images can be obtained from either an array of imaging sensors or a single imaging sensor. The described technique relies on the concept that each view is allowed to vote on the contents of the scene via ray tracing. Various sharpness metrics are utilized for estimating the locations of visible surfaces in the views, and reconstruction is posed as an optimization problem.

Multiple overlapping images or views of a scene are taken from the passive imaging sensor(s) at known positions. Each view contains unique information about the contents of the scene. The information from all the views is combined to form a 3D model, even when the object of interest is only partially visible in the input images. Because the imaging sensor(s) used is totally passive, it is more difficult to detect and/or jam. Further, the system and method do not rely on the detection and matching of image features, which is a very hard problem and a source of error.

The described system and method can be used in a large number of tasks, including but not limited to target recognition and activity recognition. For example, the described system and method could be used to form 3D models of targets which are occluded by brush and foliage in a surveillance application in which a passive imaging sensor such as a camera is mounted on a piloted aircraft or an unmanned aerial vehicle (UAV).

In one embodiment, a method of reconstructing object surfaces in three-dimensions from a plurality of two-dimensional input images of an object includes obtaining the plurality of two-dimensional input images of the object using at least one passive imaging sensor, determining a reconstruction volume that contains the object surfaces to be reconstructed, dividing the reconstruction volume into three-dimensional voxels of uniform size, for a predetermined point in each voxel, collecting a vote for each of the input images, determining the cost of the votes for each voxel, detecting the object surfaces based on the determined costs of the voxels, reconstructing the object surfaces based on the detected object surfaces and forming a reconstruction of the object surfaces contained in the reconstruction volume, and displaying an image of the reconstruction of the object surfaces on a display device.

In another embodiment, a system for reconstructing object surfaces in three-dimensions from a plurality of two-dimensional input images of an object includes at least one passive imaging sensor, a reconstruction volume determination module, a reconstruction volume dividing module, a vote collection module, a cost determination module, an object surface detection module, an object surface reconstruction module, and a display device.

DRAWINGS

Figure 4A:
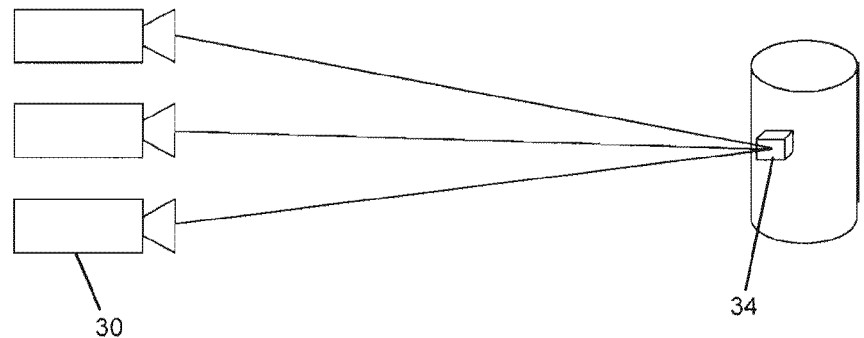
Figure 4B:
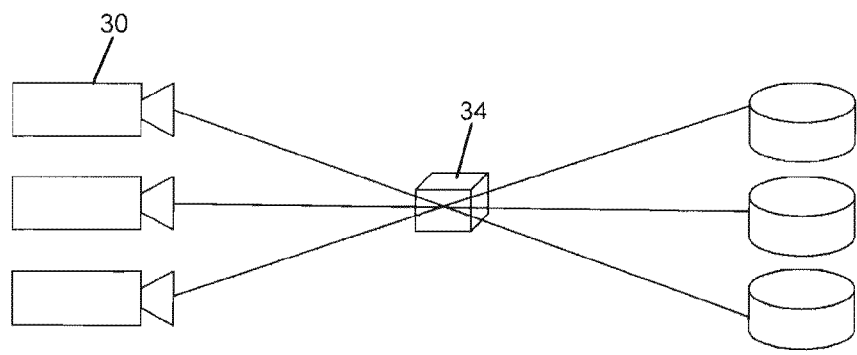
Figure 4C:
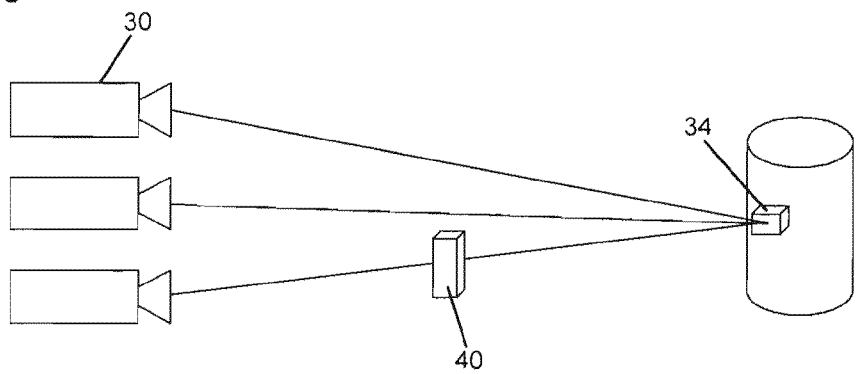

FIGS. 4a, 4b, and 4c illustrate voxel voting when all input images vote on a voxel on an object surface, all input images vote on an empty voxel, and one of the input images has an occluded view of the object, respectively.

Figure 5:
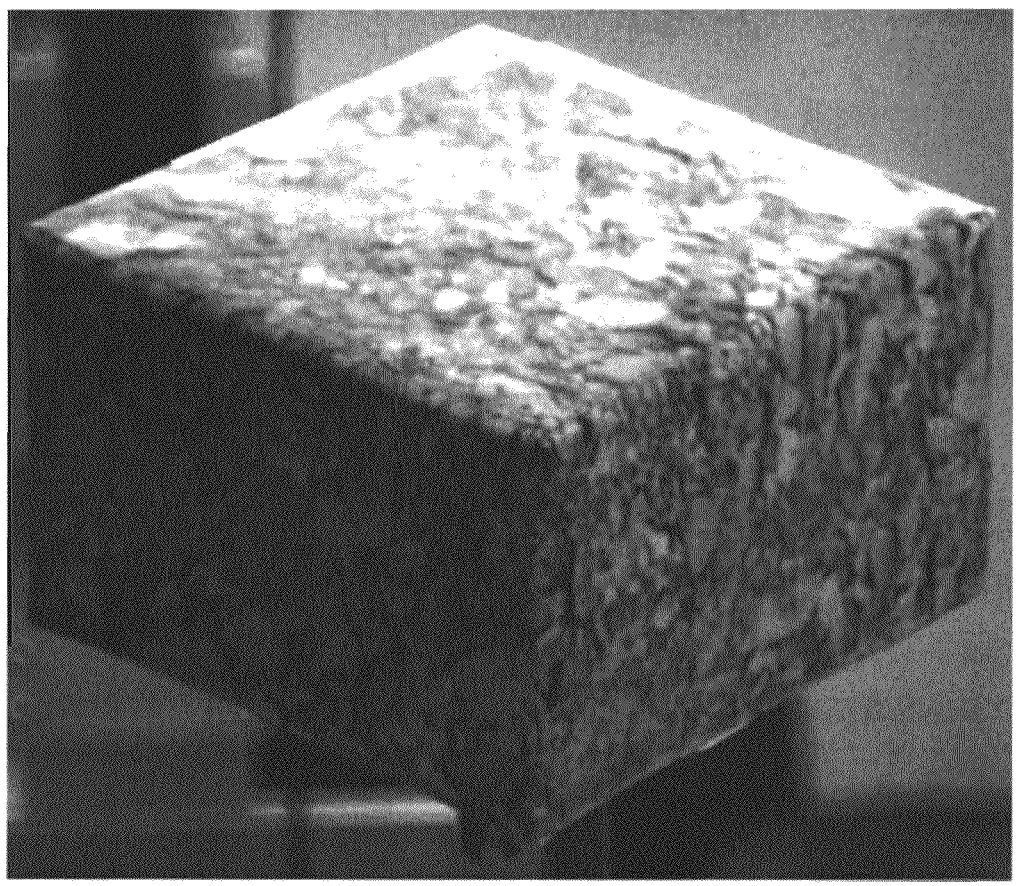

FIG. 5 illustrates a textured box used to generate input images.

Figure 6:
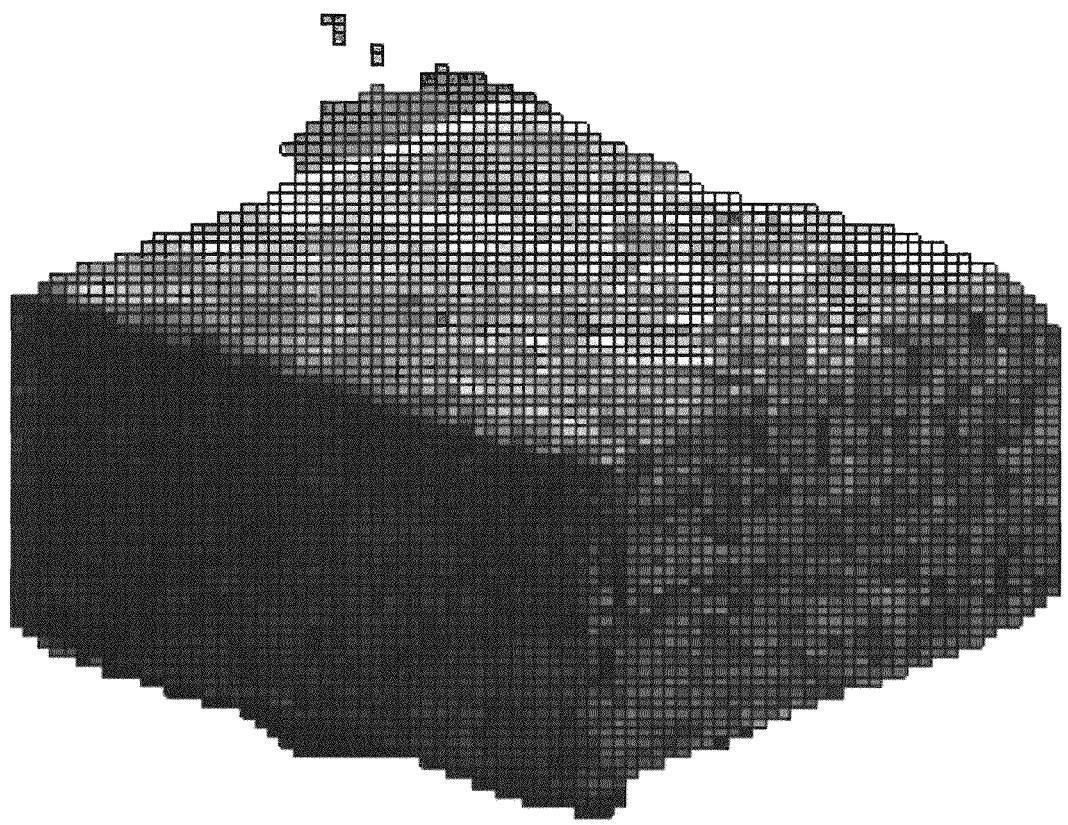
Figure 7:
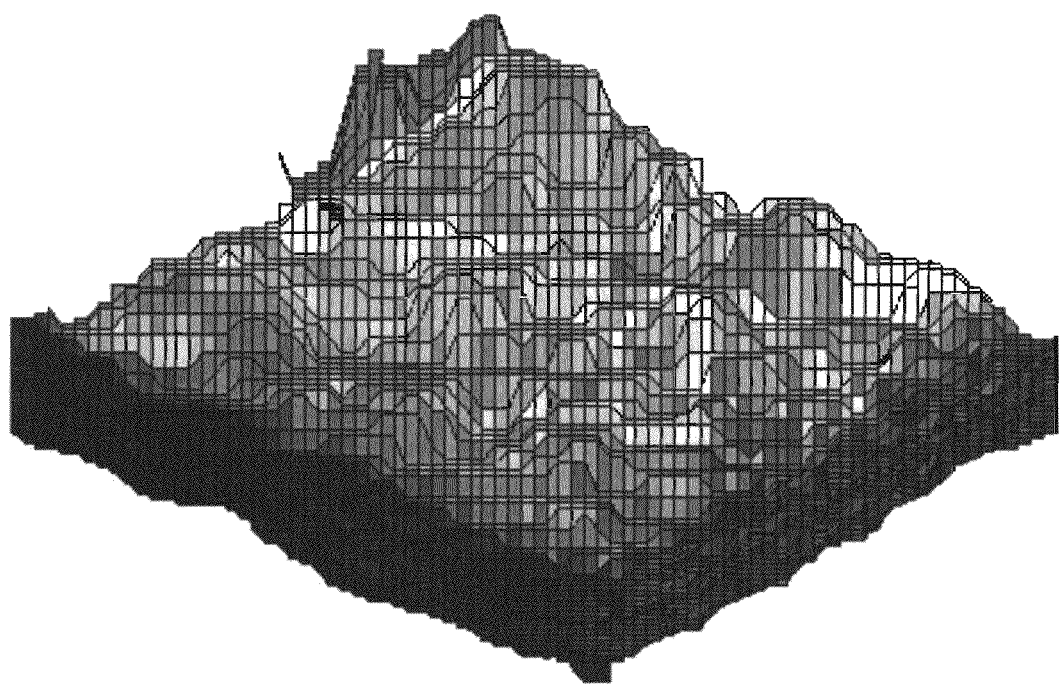
Figure 8:
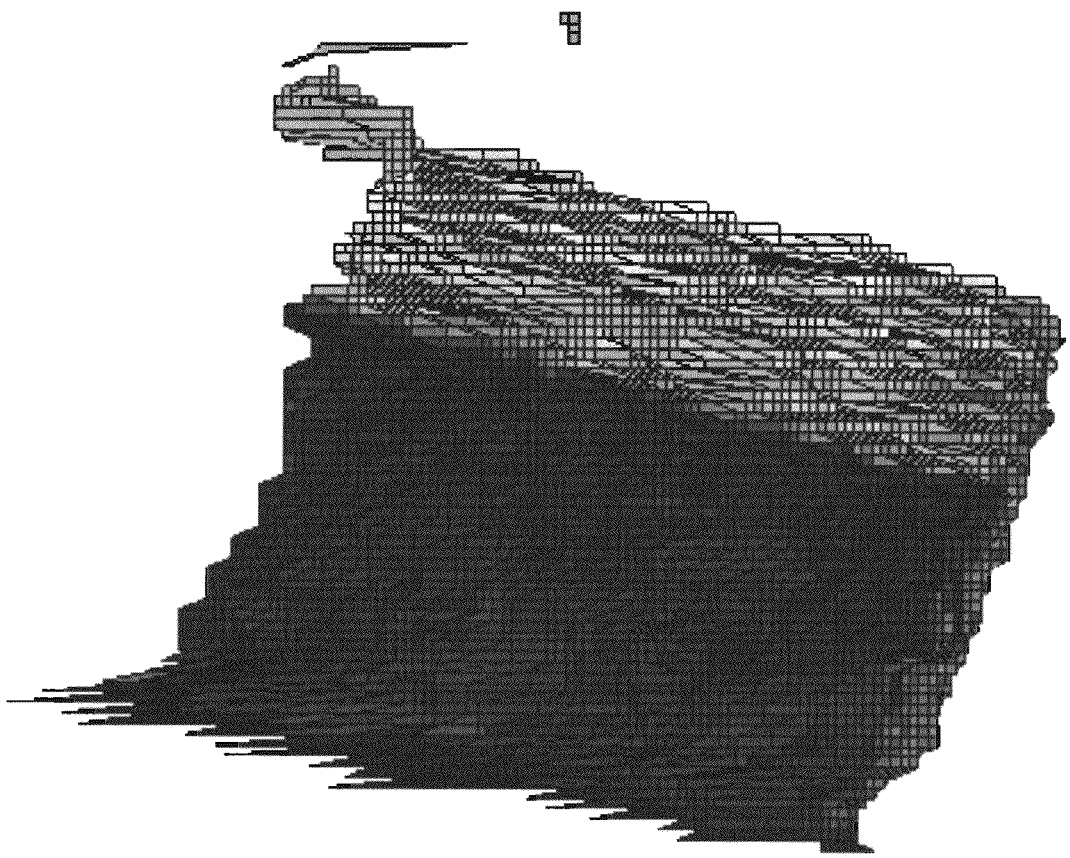

FIGS. 6-8 illustrate 3D models of the reconstructed box surfaces viewed from a front perspective, a top perspective and a side perspective, respectively.

Figure 9:
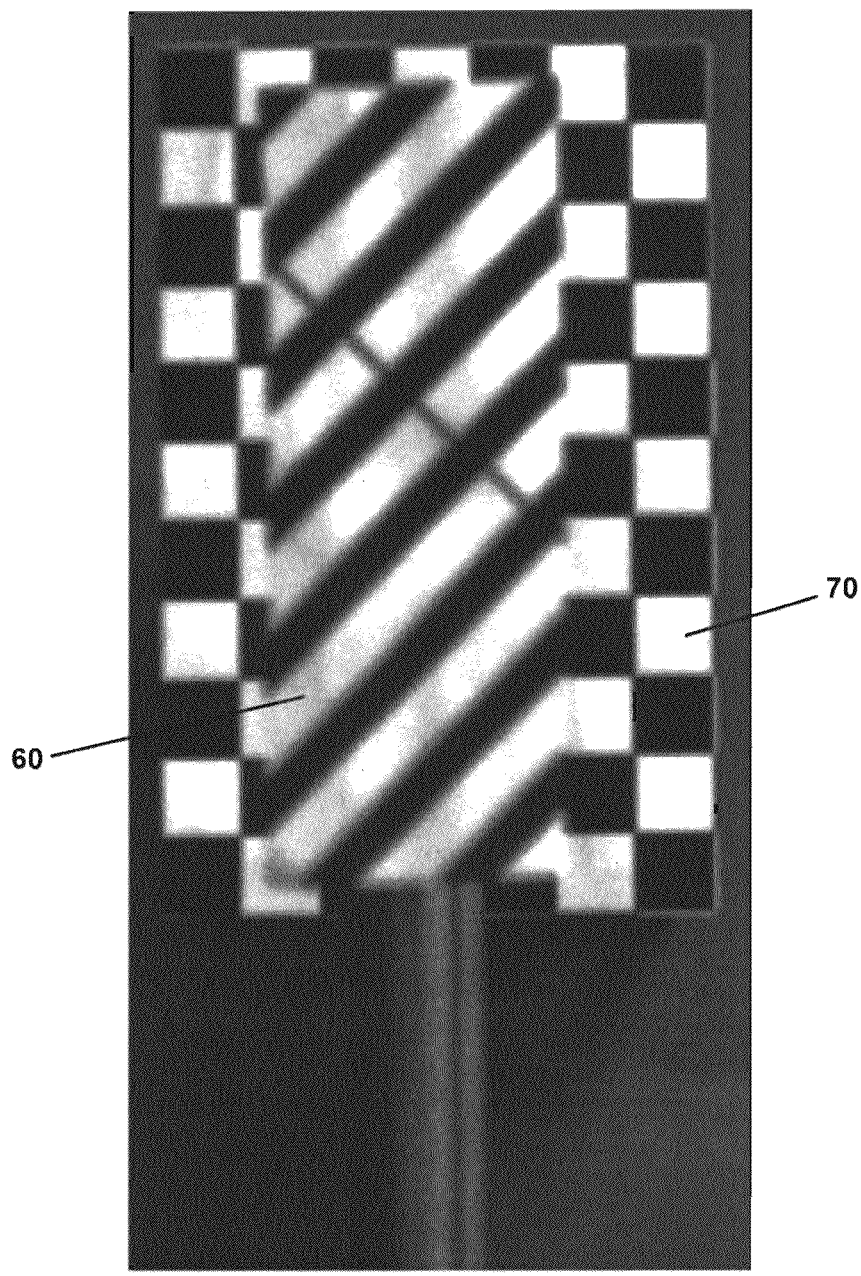
Figure 10:
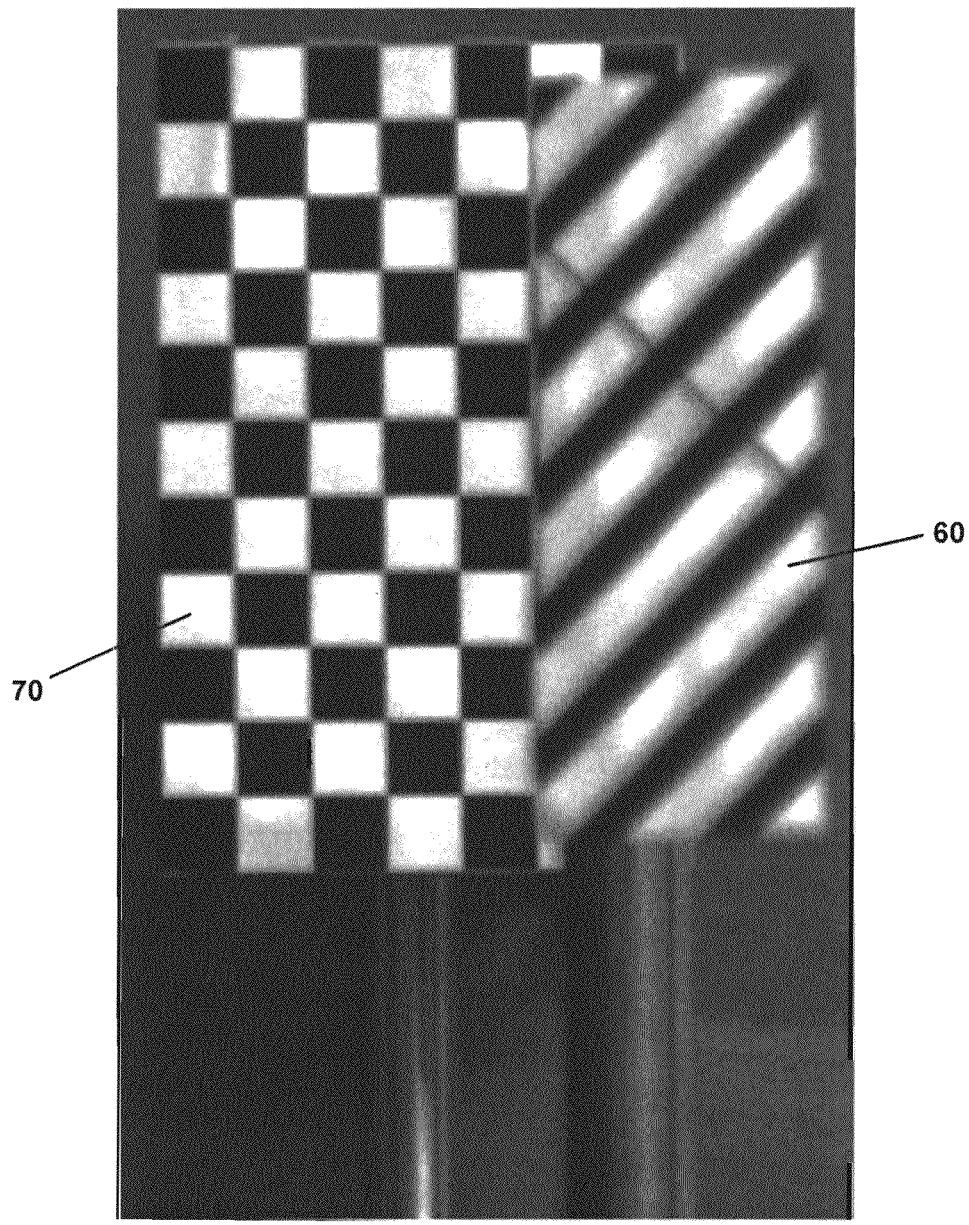
Figure 11:
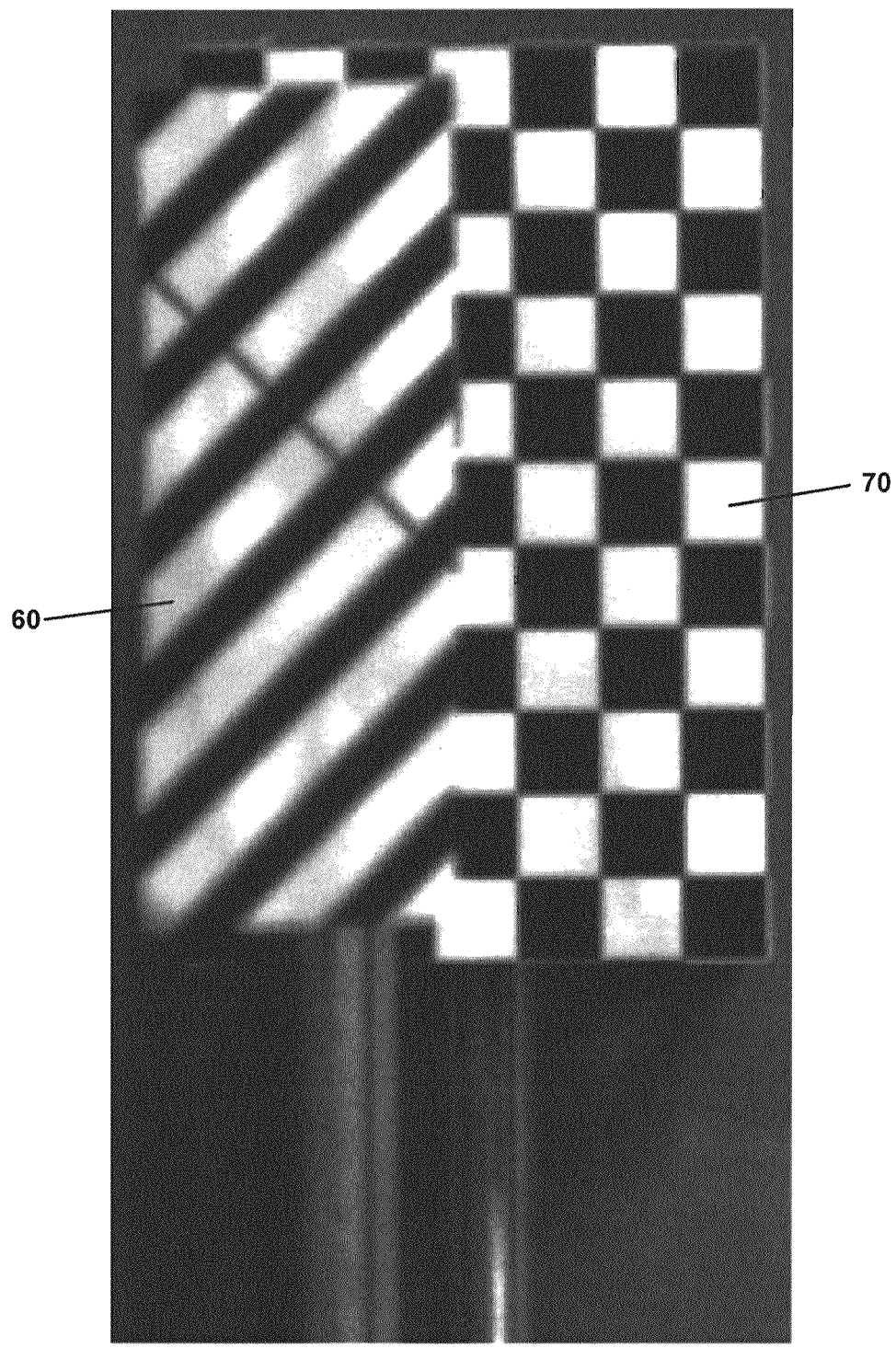

FIGS. 9-11 are examples of input images from an occluding planes dataset.

Figure 12:
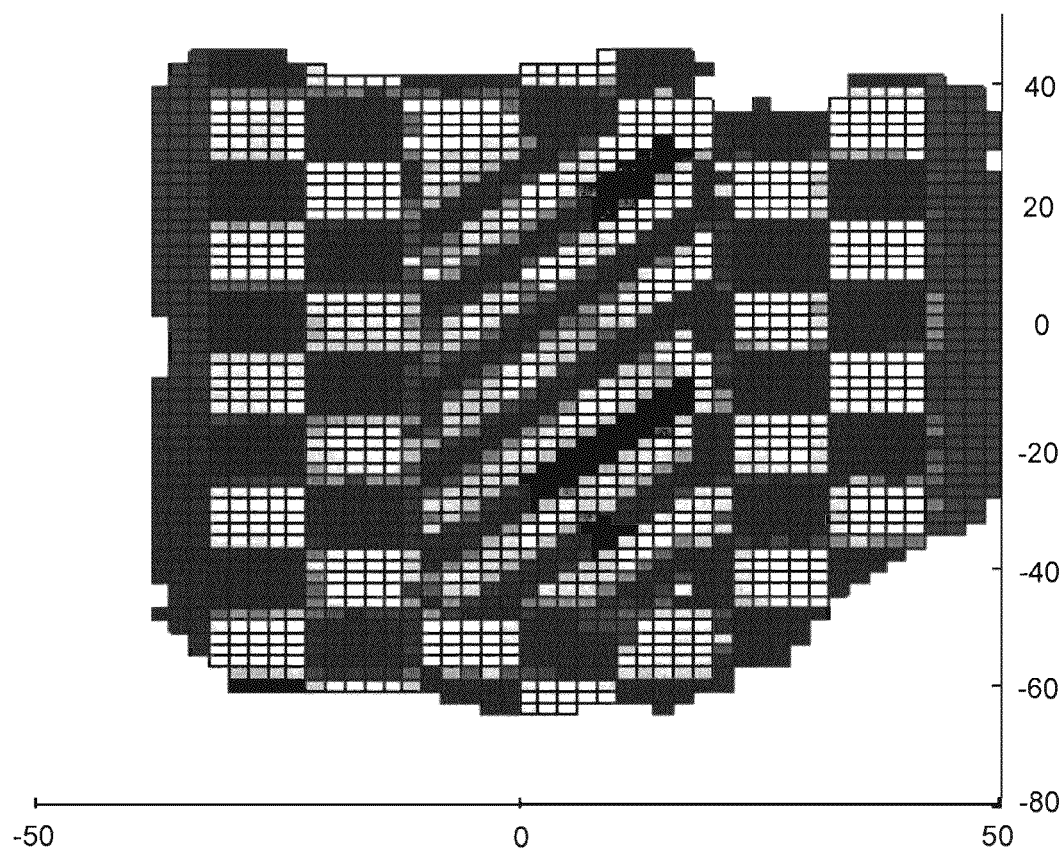
Figure 13:
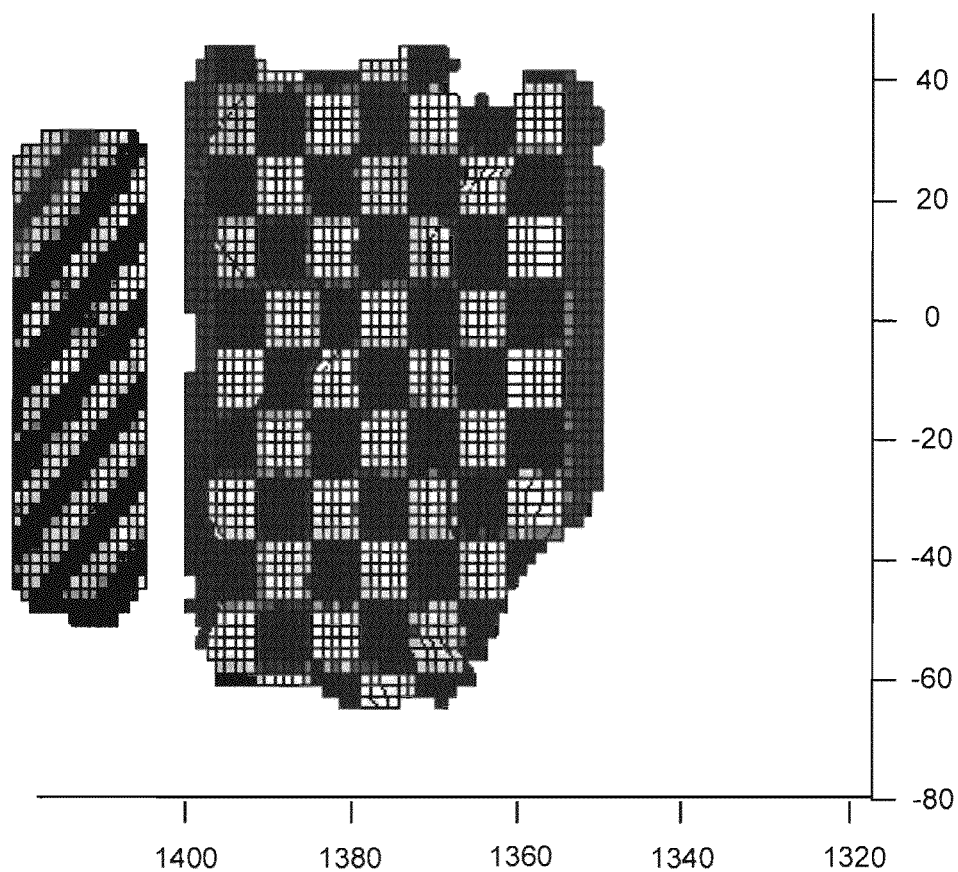
Figure 14:
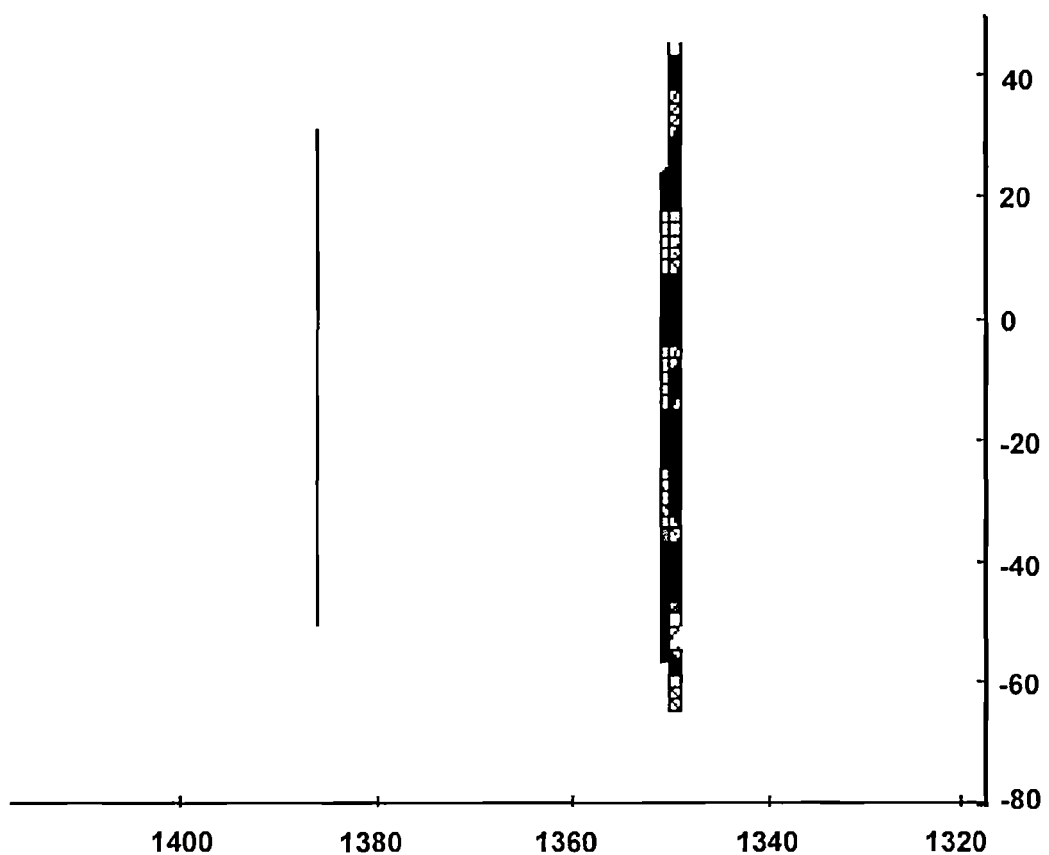

FIGS. 12-14 are 3D models of the reconstructed occluding planes dataset viewed from the front, diagonal and side, respectively.

DETAILED DESCRIPTION

The system and method described herein use integral imaging concepts to perform a 3D reconstruction of an object. Images of the object are collected from various viewpoints using either a single moveable passive imaging sensor, or an array of passive imaging sensors (synthetic aperture imaging). Each view contains unique information about the contents of the object. The reprojected information is combined in a robust way in order to accurately infer the object's structure. It is assumed that the imaging sensors are calibrated and their relative positions and orientations relative to the object are known.

The described technique includes a voxel-voting formulation, in which each view "votes" on the contents of a scene point via ray projection. This voting is performed for each discrete voxel in a reconstruction volume, and a cost function is utilized for each voxel. Finally, the surfaces of objects in the reconstruction volume are detected and reconstructed based on this cost function using a local optimization procedure.

The object can be unobstructed or partially occluded so that only a portion is visible. Integral imaging concepts provide a good starting point for development of an elegant approach to reconstructing occluded surfaces. Aside from the fact that it provides elegant approaches for the reconstruction of occluded object surfaces, there are several other advantages to the described integral imaging-based approach. First, it is based on simple projective geometry, and is quite intuitive. Second, the voxel-voting procedure produces data which is quite amenable to probabilistic interpretations and inferences. In addition, the described reconstruction technique does not rely at all on point correspondences (as many existing reconstruction algorithms do), so the problem of computing distinctive feature points and matching them across images is completely avoided.

Figure 1:
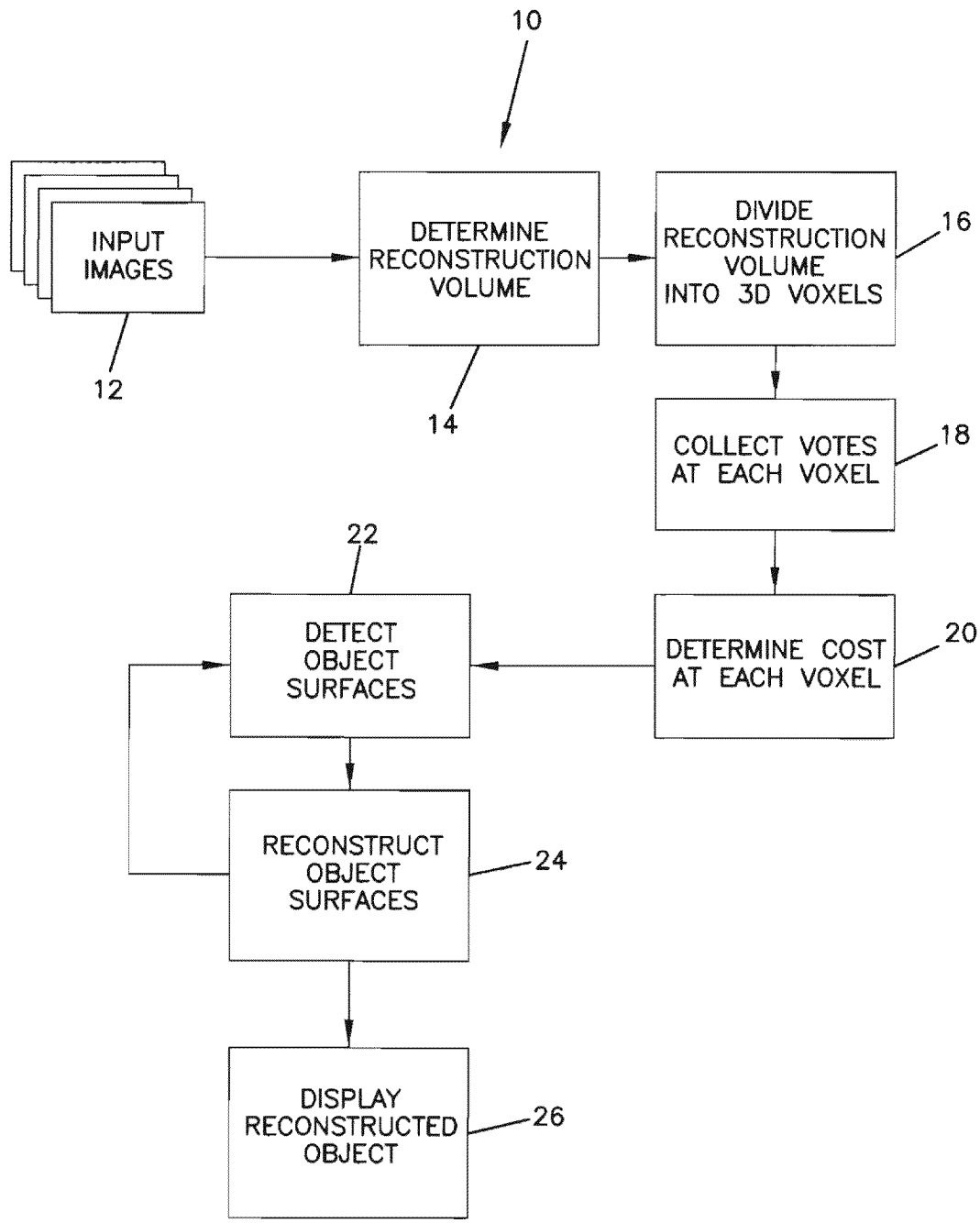
FIG. 1 is a flow chart of steps in the reconstruction process.

With reference now to FIG. 1, a flow chart of steps in the reconstruction process 10 is illustrated. The process 10 includes obtaining a plurality of input images 12 of an object(s) of interest. A reconstruction volume that contains at least a portion of the object is then determined 14, with the reconstruction volume then being divided into 3D voxels 16. Thereafter, a vote is collected 18 for each of the input images at a predetermined point, preferably the centerpoint, in each voxel. The cost of the votes for each voxel are then determined 20 and, based on the determined costs, object surfaces are detected 22. In step 24, the object surfaces are then reconstructed based on the detected object surfaces and a reconstruction of the object surfaces contained in the reconstruction volume is formed. An image of the reconstruction of the object surfaces can then be displayed 26 on a display device.

Input Images

Figure 2:
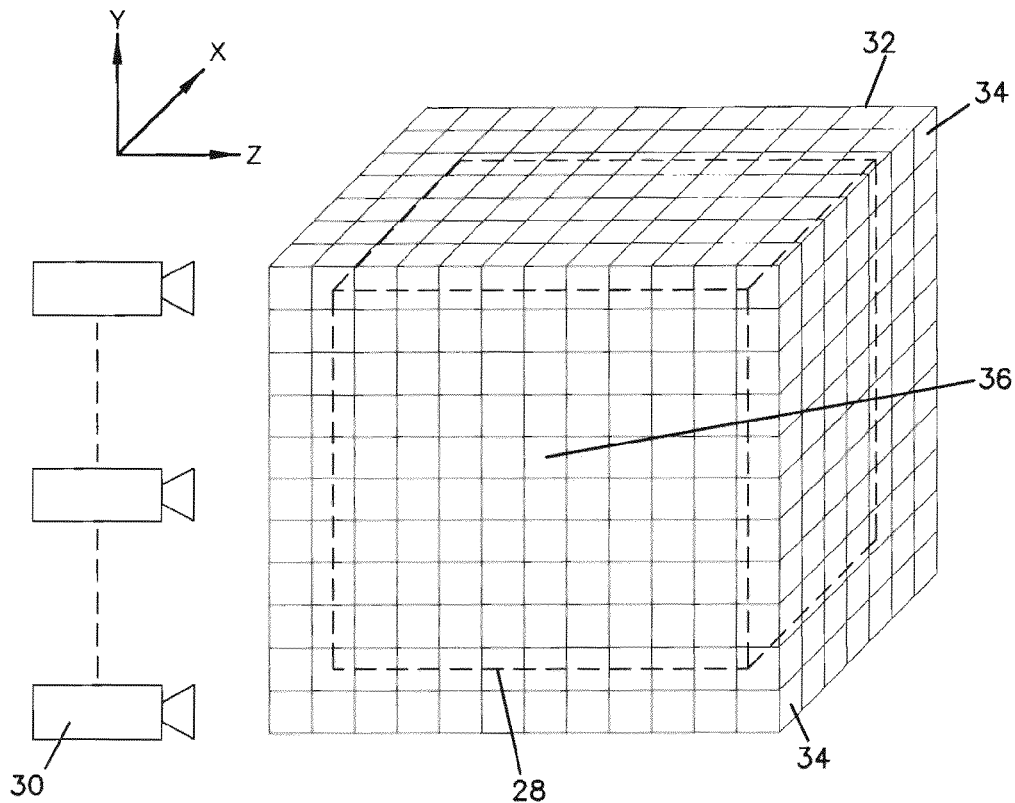
FIG. 2 illustrates a reconstruction volume and voxels.

The input images are two-dimensional images obtained from various viewpoints or positions relative to the object of interest using either a single passive imaging sensor that is movable relative to the object, or an array of passive imaging sensors that are located at different positions relative to the object. With reference to FIG. 2, an object in the form a rectangular box 28 is illustrated is dashed lines. FIG. 2 also depicts a single imaging sensor 30 that is movable relative to the box 28 for obtaining different views of the box. FIG. 2 could alternatively be construed as depicting a plurality of imaging sensors 30 at different orientations relative to the box 28. For purposes of this description, it will be assumed that a single movable imaging sensor is present, although it is to be understood that a plurality of imaging sensors could be used.

As used herein, a passive imaging sensor is one that does not emit electromagnetic waves in order to capture the images or views of the object. Any type of passive imaging sensor can be used including, but not limited to, a camera or an infrared sensor.

The described process 10 also needs to know the relative positions and orientations of the imaging sensor relative to the object for each view. It is assumed that the relative positions and orientations of the imaging sensor relative to the object are known for each image used. Techniques for determining positions and orientations of an imaging sensor relative to an object are known. In the following description, it will be assumed that in the case of a movable imaging sensor, that the sensor is movable only in the x and y-directions shown in FIG. 2, but is fixed in the z-direction and points in the z-direction toward the object. It will also be assumed that the object to be reconstructed is the box 28.

The imaging sensor 30 can be mounted on any platform for obtaining the images. Suitable examples of platforms include, but are not limited to, land vehicles, ships, and air vehicles such as manned aircraft or UAV's.

The number of images 12 used in the process can vary. In general, the more images that are used in terms of number of images as well as at different positions and orientations, the more accurate the resulting reconstruction. At least two input images must be used. There is no perceived upper limit on the number of images used, although data processing limitations of whatever computing device is used to process the images may limit the number of images. In an example described below, 25 images were used.

Only those surfaces of the box 28 that are captured in the images are reconstructed. A surface that does not show up in any of the images is not reconstructed although the surface can be estimated or inferred and added to the resulting reconstruction.

Reconstruction Volume

The process 10 then determines the reconstruction volume 32 in 3D in step 14. The reconstruction volume 32 is an imaginary volume that contains at least a portion of the box 28. Any portion of the box 28 that is not within the reconstruction volume 32 would not be included in the reconstruction process. In the example described herein, the box 28 (or other object) will be described as being contained entirely within the reconstruction volume 32. However, if there are portions of the object that are of less interest, those portions need not be included in the volume.

The reconstruction volume can be any shape and size sufficient to contain the object of interest. The illustrated reconstruction volume 32 is a cube-shaped volume enclosing the entirety of the box 28. The reconstruction volume is preferably user specified, entered by the user so that it is of sufficient size to encompass the object surfaces to be reconstructed. However, the reconstruction volume can be determined automatically or semi-automatically, requiring less user input.

In order to optimize performance of the process 10, the walls of the box 28 should be spaced from the walls of the reconstruction volume 32 in the z-direction (i.e. the depth direction), and preferably the object should be near the middle of reconstruction volume 32 in the z-direction. It is also preferred, but not required, that the walls of the box 28 be spaced from the walls of the reconstruction volume 32 in the x and y-directions as well.

Dividing into Voxels

After the reconstruction volume is determined, the volume 32 is divided into discrete blocks or voxels 34 at step 16. The voxels 34 are smaller 3D volumes within the reconstruction volume 32. The voxels 34 are of uniform shape and size, and are illustrated as being rectangular-shaped blocks. While there is no limit on the number of voxels, the more voxels 34 that are used, i.e. the smaller the voxels, the better the accuracy of the resulting reconstruction.

Voxel Vote Collection

To perform vote collection 18, the votes for each of the input images at a predetermined point in each voxel 34 are collected. The predetermined point is preferably the centerpoint 36 of each voxel. Since each camera views the scene from a different perspective, each image contains different information about its contents. This information is combined so that later it can be used to accurately infer the locations and structures of surfaces of the object in 3D.

To determine the votes, ray backprojection from each of the voxel centerpoints 36 to the passive imaging sensor(s) 30 is used. For each voxel, the image sensor votes on the contents of the voxel by reprojecting a ray (i.e. ray backprojection) from its optical center, at the location where the respective image was taken, through the voxel. The image sensor's "vote" or "belief" on the contents of this voxel are defined as the grayscale (or RGB) value at the pixel location at which this ray intersects the image sensor's image plane.

The mathematical formulation is based on simple ray-tracing optics, and the image sensor is represented using a pinhole model. The contents of the centerpoint of each voxel is assumed to represent the entire voxel, where the coordinates of the centerpoint 36 are denoted as (X, Y, Z).

The 3D coordinates of the image sensor's optical center are denoted as (Xc; Yc; 0), where it can be assumed without loss of generality that the image sensor lies on the XY-plane. For the sake of simplicity, it is also assumed that the image sensor points along the Z-axis, so that a point's Z-coordinate indicates its depth from the image sensor. The pixel coordinates of this voxel's projection into the image sensor can then be computed as follows:

$$u = \frac{(X - X_c)m_x}{Z/f} + c_x \quad (1)$$

$$v = \frac{(Y - Y_c)m_y}{Z/f} + c_y \quad (2)$$

where f is the camera focal length in meters, $m_x$ and $m_y$ are the pixels per meter in the X and Y directions, respectively, and $c_x$ and $c_y$ are the pixel coordinates of the image center. If the image point (u; v) happens to be at a non-integer pixel location, linear interpolation is used to infer the intensity value at this location.

Some common voxel voting scenarios are illustrated in FIGS. 4a-c for three common scenarios. For purposes of FIGS. 4a-c, it will be assumed that a single movable imaging sensor 30 is provided that takes three images from different positions relative to an object. FIG. 4a illustrates the ideal case, in which the voxel 34 in question lies on the surface of an object in 3D, and the imaging sensor 30 has unoccluded views of it. In this case, one can expect the votes of all view of the imaging sensor to agree on the contents of the voxel. However, since the entire reconstruction volume is divided into voxels, and one does not know a priori which of them actually contain object surfaces, votes at every voxel in the space must be collected.

FIG. 4b illustrates the case when the imaging sensor votes on an empty voxel, i.e. a voxel that does not lie on the object. Since the voxel is empty, the ray from the imaging sensor's optical center through the voxel will intersect with whatever object is next along its path. In general, one does not expect the votes to agree in this case. This information will be used later to determine which voxels contain object surfaces.

Finally, FIG. 4c shows the case when one of the views of the voxel is occluded by an object 40. In this case, the votes from unoccluded views will be in agreement regarding the voxel contents, but the occluded view will disagree. If the spacing between the imaging sensor positions is large enough compared to the occluding objects in the scene, one can still expect there to be a good deal of agreement between the votes, even when a few of them are occluded.

Voxel Cost Determination

After votes are collected, the cost at each voxel is determined. The goal is to decide, based on these votes, which of the voxels contain object surfaces, and which are empty. As illustrated earlier, when a voxel contains the surface of an object, one expects the votes to mostly agree on its contents, even when some of the views are occluded. Conversely, one expects the votes to largely disagree on the contents of a voxel which is empty. A suitable means is used to gauge the measure of agreement among votes to determine which voxels contain object surfaces. In general, the cost at each voxel is inversely proportional to how much the votes for each voxel agree.

One method for measuring the degree of agreement among votes at any given voxel is to use sharpness metrics. The term sharpness metrics is used since, in terms of visualization, slices of the reconstruction volume that contain object surfaces appear in-focus or sharp.

Figure 3:
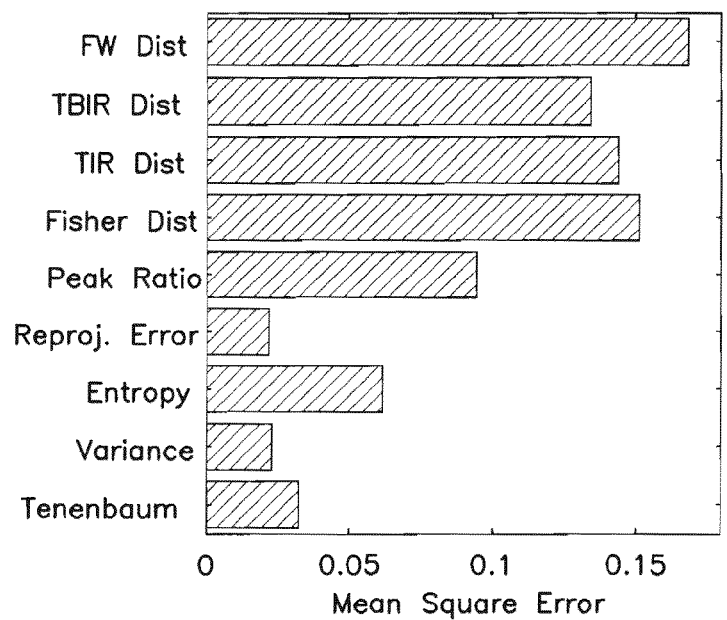
FIG. 3 illustrates various sharpness matrices used in the cost determination.

One approach is to form the histogram of the votes at a certain voxel, which is proportional to the probability distribution over all possible intensity (or RGB) values. With reference to FIG. 3, some of the sharpness metrics investigated exploit this interpretation by measuring characteristics of the probability distribution, such as its variance or entropy (these are actually measures of disagreement). Another metric is the peak ratio, which is the ratio of the first and second largest peaks in the distribution. In general, the advantage of the probabilistic interpretation is that all vote information is retained and can be used in its entirety in the reconstruction process. However, this may result in slower processing due to the large volume of information which is retained.

Another approach is to take the mean of the votes at each voxel in the reconstruction volume, and then treat each slice of the volume as an image. Sharpness metrics which operate on this set of data include standard image processing techniques for measuring local sharpness in images, which are often used in autofocus algorithms.

The Tenenbaum metric is one example, where one simply sums the gradients in a small neighborhood around a pixel to obtain its sharpness (see J. Schlag et al., *Implementation of automatic focusing algorithms for a computer vision system with camera control*, Technical report, Carnegie-Mellon University, 1983).

Other metrics which operate on the slice images include the Fisher, TIR, TBIR, and Fechner-Weber distances (see F. Sadjadi, *Comparative Image Fusion Analysis*, Proc. IEEE Conf. Computer Vision and Pattern Recognition, 2005). In each of these, a pixel's sharpness is computed by defining a small inner window surrounding the pixel, and a larger outer window surrounding the inner window, and comparing various statistics of these windows. The underlying idea is that, when the region around the pixel is in-focus, the statistics of the pixel values in the inner window will differ significantly from those in the outer window.

Finally, one additional source of information is the reprojection error. In many computer vision applications, reprojection error is defined as the distance between an observed feature in image coordinates, and its reprojection into the image based on an approximate 3D model of the scene. However, since the process described herein does not detect or track visual features, we instead define the reprojection error in terms of absolute difference in grayscale intensity. Specifically, if one defines $V_i(X, Y, Z)$ as the vote of camera i about the contents of voxel (X, Y, Z), then the reprojection error at this voxel can be computed as:

$$R_{xyz} = \sum_i |V_i(X, Y, Z) - \mu_{xyz}| \quad (3)$$

where $\mu_{xyz}$ is the grayscale value predicted by the described process. In all the results presented here, $\mu_{xyz}$ is taken as the most common vote at this voxel, which is the mode of the (discrete) probability distribution.

FIG. 3 shows a comparison of various sharpness metrics. This experiment was performed by first constructing a ground-truth depth map for a synthetically generated dataset. At each (X,Y) location in the reconstruction volume we chose one depth Z, which had the highest sharpness according to the metric. The resulting estimated depth map from each sharpness metric was compared to the ground-truth, and the mean square error was computed. The results indicate that the most accurate depth maps were obtained using the reprojection error and variance of the vote distribution as sharpness metrics. It is to be realized that other sharpness metrics could be used, and metrics other than reprojection error and variance may provide acceptably accurate depth maps or even more accurate depth maps in other circumstances.

The cost is computed for every voxel, which should be inversely proportional to agreement or sharpness. We have seen above that both the reprojection error and the variance of the probability distribution at each voxel are good indicators of disagreement. These two sources of information are combined in order to formulate the cost function. We define $V_{xyz}$ as the variance of the votes at voxel (X, Y, Z). The cost function for this voxel is then written as:

$$C_{xyz} = \alpha V_{xyz} + \beta R_{xyz} \tag{4}$$

where $\alpha$ and $\beta$ are positive weighting coefficients.

Object Surface Detection and Surface Reconstruction

In order to detect and reconstruct objects in the 3D reconstruction volume, we aim to find voxels that have low cost according to equation 4. It also makes sense to take spatial relationships between voxels into account, both to suppress noise and to ensure spatial continuity of reconstructed objects. So one goal can be stated as follows: locate large regions of the reconstruction volume in which the voxels have low cost. Additionally, it is assumed that, although there can be multiple objects present at different depths, each object can occupy only one depth Z at each (X, Y) location in the volume. In other words, the aim is to reconstruct only the visible surface of each object. Each voxel is therefore declared to either contain the visible surface of an object, or be empty.

In order to perform this spatially coherent minimization, a local minimization scheme is utilized, which is quite tractable and has been found to perform well in practice. First, one searches for local minima in the cost at each (X, Y) location over depth Z. These local minima are stored as points in the 3D reconstruction volume. Given the set of all such points, large clusters are identified using a proximity constraint and 3D connected component analysis, where each large cluster can be thought of as a separate object in space. Proximity constraint and 3D connected component analysis are known by persons of ordinary skill in the art. Finally, holes in the objects are filled in, the surface of each object is smoothed using a median filter, and the spatial extent of the objects is expanded in the cost volume using hysteresis thresholding.

The result of the minimization described above is a set of reconstructed object surfaces. However, this initial reconstruction can then be used to improve the accuracy for partially occluded objects by repeating steps 22 and 24. For a voxel that is occluded in some views, it now becomes possible to accurately identify the exact imaging sensor in which the view of this voxel is occluded. Since clearly the votes from these views do not represent the contents of the occluded voxel, but rather the surface of the occluder, these invalid votes are discarded. The cost is recalculated at these voxels, and steps 22 and 24 performed again. This is repeated until all occluded objects have been reconstructed.

The reconstructed surfaces are then displayed on a display device such as a display screen connected to a computing device, for example a general purpose computer, that handles the data processing involved in the described technique. The various steps in the described technique and illustrated in FIG. 1, can be implemented on one or more computing devices, such as general purpose computers, with the computing device including modules, implemented in software or firmware, for performing many of the various steps. For example, a reconstruction volume determination module that is configured to determine the reconstruction volume in step 14 can be utilized. In addition, a reconstruction volume dividing module that is configured to divide the determined reconstruction volume into three-dimensional voxels of uniform size in step 16 can be utilized. In addition, a vote collection module that is configured to, for a predetermined point in each voxel, collect a vote for each of the input images in step 18 can be utilized. In addition, a cost determination module that is configured to determine the cost of the votes for each voxel in step 20 can be utilized. In addition, an object surface detection module that is configured to detect the object surfaces based on the determined costs of the voxels in step 22 can be utilized. In addition, an object surface reconstruction module that is configured to reconstruct the object surfaces based on the detected object surfaces and form a reconstruction of the object surfaces contained in the reconstruction volume in step 24 can be utilized.

To verify the effectiveness of the described technique, the technique was demonstrated on different sets of real data. For these experiments, the input images were generated using one camera on a moveable platform with two degrees of freedom. Objects in the scene were stationary, so that images taken at different times would be equivalent to simultaneous images from a camera array.

Experiment 1

With reference to FIG. 5, in the first experiment, the scene consisted of a single box 50, oriented such that one of its corners pointed along the Z-axis. The input images consisted of 25 different views of the box 50, with the camera positions lying on a 5×5 array on the XY-plane, and the camera pointing along the Z-axis. FIG. 5 shows one example of an input image. Only surfaces of the box which are visible from the camera can be reconstructed, which in this case includes only three of the box's six faces. Surfaces were reconstructed using the technique described above.

Various views of the reconstructed box can be seen in FIGS. 6, 7 and 8, which show reconstructed views from a front perspective view (FIG. 6 with the top and two side surface reconstructed), a top perspective view (FIG. 7 with the top surface and portions of the side surfaces reconstructed) and a side perspective view (FIG. 8 with a side surface and a portion of the top surface reconstructed), respectively. To improve visualization, a mesh grid was fit to the reconstructed surface points, and the grayscale value at each voxel was chosen as that of the corresponding pixel in one of the input images. As can be seen from FIGS. 6-8, the three surfaces of the box 50 visible in FIG. 5 were reconstructed accurately.

Experiment 2

One of the major advantages of the described technique is that it can effectively reconstruct objects which are partially occluded in all of the input images. With reference to FIGS. 9-11, this is demonstrated using images of a scene containing two planar objects 60, 70, one in front of the other. The object 60 is in front and includes a black and white striped pattern. The object 70 is spaced behind the object 60 and includes a black and white checkerboard pattern.

The dataset used consisted of 40 images of the scene, taken from the moveable platform described above in experiment 1. In all of the input images, the front plane 60 (stripes) is occluding part the rear plane 70 (checkers). In other words, the rear plane 70 is never fully visible in any of the input images. FIGS. 9-11 illustrate three of the input images.

In the first phase, each voxel in the reconstruction volume collects votes from all the camera views. One can visualize a slice of the reconstruction volume at any given depth by taking the means of all the votes at each voxel. Even though the rear plane 70 (checkers) is never fully visible in any of the input images, it can be seen in the slice image at that depth. Results of the reconstructed surfaces can be seen in FIGS. 12-14 which illustrate reconstructions from the front, diagonal and side, respectively. As discussed above for experiment 1, a mesh model was fit to the surfaces for visualization, and the grayscale values from one of the input images were mapped to the model. Notice that the described technique successfully infers the 3D structure of the checkered plane 70, even though it is occluded, and an accurate depth map is obtained (e.g., side view of FIG. 14).

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of reconstructing object surfaces in three-dimensions from a plurality of two-dimensional input images of an object, comprising:
   a) obtaining the plurality of two-dimensional input images of the object using at least one passive imaging sensor;
   b) determining a reconstruction volume that contains the object surfaces to be reconstructed;
   c) dividing the reconstruction volume into three-dimensional voxels of uniform size;
   d) for a predetermined point in each voxel, collecting a vote for each of the input images;
   e) determining the cost of the votes for each voxel;
   f) detecting the object surfaces based on the determined costs of the voxels;
   g) reconstructing the object surfaces based on the detected object surfaces and forming a reconstruction of the object surfaces contained in the reconstruction volume; and
   h) displaying an image of the reconstruction of the object surfaces on a display device.

2. The method of claim 1, wherein obtaining the plurality of two-dimensional input images of the object using at least one passive imaging sensor comprises using a single passive imaging sensor that is movable relative to the object or using an array of passive imaging sensors that are at different positions relative to the object.

3. The method of claim 1, wherein the passive imaging sensor is a camera or an infrared sensor.

4. The method of claim 1, wherein the reconstruction volume contains the entirety of the object.

5. The method of claim 1, wherein the predetermined point in each voxel is the centerpoint of each voxel.

6. The method of claim 1, wherein the object is partially occluded, and further comprising discarding votes associated with the input images in which the predetermined points are occluded, re-determining the cost of the votes for voxels having occluded predetermined points, and thereafter repeating f)-g).

7. The method of claim 1, wherein e) comprises using a plurality of sharpness metrics.

8. The method of claim 1, wherein d) comprises using ray backprojection from each of the predetermined points to the passive imaging sensor, and for each two-dimensional input image the pixel value at the location where the ray intersects the image plane is the vote for the predetermined point in the respective voxel.

9. A system for reconstructing object surfaces in three-dimensions from a plurality of two-dimensional input images of an object, comprising:
   a) at least one passive imaging sensor that is configured to obtain the plurality of two-dimensional input images of the object;
   b) a reconstruction volume determination module that is configured to determine a reconstruction volume that contains the object surfaces to be reconstructed;
   c) a reconstruction volume dividing module that is configured to divide the determined reconstruction volume into three-dimensional voxels of uniform size;
   d) a vote collection module that is configured to, for a predetermined point in each voxel, collect a vote for each of the input images;
   e) a cost determination module that is configured to determine the cost of the votes for each voxel;
   f) an object surface detection module that is configured to detect the object surfaces based on the determined costs of the voxels;
   g) an object surface reconstruction module that is configured to reconstruct the object surfaces based on the detected object surfaces and form a reconstruction of the object surfaces contained in the reconstruction volume; and
   h) a display device that is configured to display an image of the reconstruction of the object surfaces.

10. The system of claim 9, wherein the at least one passive imaging sensor comprises a single passive imaging sensor that is movable relative to the object or an array of passive imaging sensors that are at different positions relative to the object.

11. The system of claim 9, wherein the passive imaging sensor is a camera or an infrared sensor.

12. The system of claim 9, wherein the cost determination module is configured to discard votes associated with input images in which the predetermined points are occluded, and re-determine the cost of the votes for voxels having occluded predetermined points.

13. The system of claim 9, wherein the cost determination module includes a plurality of sharpness metrics.

14. The system of claim 9, wherein the vote collection module is configured to use ray backprojection from each of the predetermined points to the at least one passive imaging sensor, and to determine the pixel value at the location where the ray intersects the image plane.

* * * * *